No. 754,186. PATENTED MAR. 8, 1904.
O. ARENDT.
PUMP VALVE.
APPLICATION FILED NOV. 28, 1903.
NO MODEL.

Witnesses
Anna H. Van Horenbay
Lawrence Fuentes

Otto Arendt    Inventor
By his Attorney
W. P. Preble Jr

No. 754,186. Patented March 8, 1904.

UNITED STATES PATENT OFFICE.

OTTO ARENDT, OF NEWARK, NEW JERSEY.

PUMP-VALVE.

SPECIFICATION forming part of Letters Patent No. 754,186, dated March 8, 1904.

Application filed November 28, 1903. Serial No. 182,974. (No model.)

*To all whom it may concern:*

Be it known that I, OTTO ARENDT, a citizen of the United States, and a resident of Newark, county of Essex, State of New Jersey, have invented certain new and useful Improvements in Pump-Valves, of which the following is a specification.

The object of my invention is to provide an improved pump-valve in which the disk is formed of soft rubber surrounding a peculiarly-shaped metallic thimble.

It has been found that the flat circular disks made of rubber or partly rubber wear out very rapidly at the center where the disk moves up and down on a stationary stem unless reinforced in some manner, and also that when reinforced by metal the disk can only be used with one-sized stem and there is no means of renewing its metal-bearing surface when it becomes worn. I have devised a thimble therefore of such form and size that when set in the rubber it obtains a thoroughly firm grip, and yet can be removed from the disk without in any way injuring the disk. When so removed, the bore of the thimble can be reamed out, so as to fit a larger valve-stem, or the inner wall of the bore may be reinforced, after which the repaired or altered thimble may be replaced in the rubber without injury or a new thimble may be inserted, if desired. In this way I secure a valve which can be used with various valve-stems whenever occasion requires and which while retaining the full pliability of the rubber can always be kept well centered about the stem.

Figure 1:
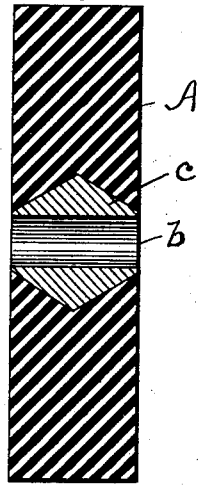
Figure 2:
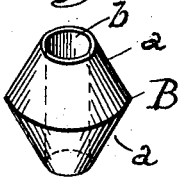
Figure 3:
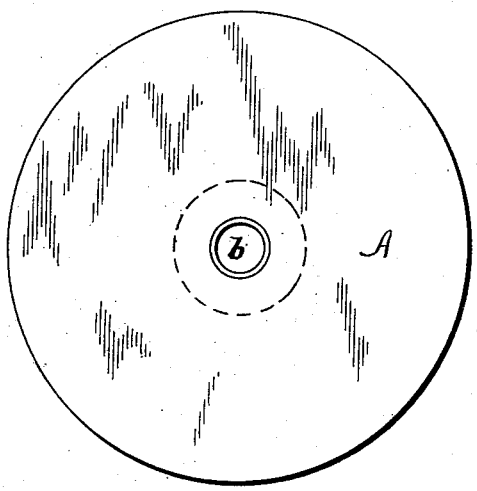

In the accompanying drawings, Figure 1 is a section. Fig. 2 is an elevation of the thimble. Fig. 3 is an elevation of the valve-disk with a thimble in it.

Same letters indicate similar parts in the different drawings.

A is the valve-disk of the usual circular form and made of rubber molded separately or around the thimble, as preferred. This rubber is preferably soft and pliable, as these disk valves generally assume a somewhat arched position when in operation.

B is a thimble made of brass or other metal with tapering sides $a\ a$ and a central bore $b$ of a size adapted to the valve-stem on which the valve-disk is to work. As shown, the thimble B is a sort of double cone, the lower half being an inverted cone and the upper half resting thereon. By reason of this construction the thimble can fit snugly in the corresponding opening $c$ in the valve-disk and secure a firm hold upon the rubber, which by reason of its toughness and elasticity allows the thimble to be forced into and out of the disk when necessary without injury to the disk.

The uses and advantages will be readily understood by those familiar with this style of valve.

I claim—

A pump-valve which consists of a disk of soft rubber and a double-cone thimble of metal set therein as a bearing-center.

OTTO ARENDT.

Witnesses:
W. P. PREBLE, Jr.,
A. H. VAN HORENBERG.